United States Patent
Wang et al.

(10) Patent No.: US 10,860,478 B2
(45) Date of Patent: Dec. 8, 2020

(54) METHOD AND DEVICE FOR STORING DATA

(71) Applicant: BEIJING BAIDU NETCOM SCIENCE AND TECHNOLOGY CO., LTD., Beijing (CN)

(72) Inventors: Yang Wang, Beijing (CN); Xunchao Song, Beijing (CN); Pengcheng Yuan, Beijing (CN); Xiaobo Liu, Beijing (CN); Xi Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 8 days.

(21) Appl. No.: 16/134,423

(22) Filed: Sep. 18, 2018

(65) Prior Publication Data
US 2019/0179748 A1    Jun. 13, 2019

(30) Foreign Application Priority Data
Dec. 13, 2017    (CN) .......................... 2017 1 1327679

(51) Int. Cl.
*G06F 12/06*     (2006.01)

(52) U.S. Cl.
CPC .. *G06F 12/0653* (2013.01); *G06F 2212/1008* (2013.01)

(58) Field of Classification Search
CPC ..................... G06F 12/0653; G06F 2212/1008
See application file for complete search history.

(56) References Cited

U.S. PATENT DOCUMENTS

| | | | | |
|---|---|---|---|---|
| 2010/0076980 A1* | 3/2010 | Dumitrean | ............. | G06F 16/31 707/741 |
| 2013/0346425 A1* | 12/2013 | Bruestle | ................ | G06F 9/5066 707/752 |
| 2014/0156708 A1* | 6/2014 | Adams | ...................... | G06F 9/34 707/803 |

(Continued)

FOREIGN PATENT DOCUMENTS

| | | |
|---|---|---|
| CN | 101639848 A | 2/2010 |
| CN | 102411634 A | 4/2012 |

(Continued)

OTHER PUBLICATIONS

English Translation for CN-106202548-A, Retrieved from EPO.*

*Primary Examiner* — Daniel C. Chappell
*Assistant Examiner* — Kendrick Lam
(74) *Attorney, Agent, or Firm* — Lathrop GPM LLP

(57) ABSTRACT

A method and an apparatus for storing data are provided. The method includes: acquiring target data, the target data including first key-value pair data, object data or array data, the key-value pair data including key data and value data, the object data including second key-value pair data, and the array data including object data; determining an object data number of the object data included in the target data, an array data number of the array data included in the target data, a first key-value pair data number of the first key-value pair data included in the target data, and a second key-value pair data number of the second key-value pair data included in the target data; determining a storage space based on the determined numbers; and storing the target data into the storage space.

7 Claims, 7 Drawing Sheets

(56) References Cited

U.S. PATENT DOCUMENTS

| | | | |
|---|---|---|---|
| 2017/0277452 A1* | 9/2017 | Joshi | G06F 3/0619 |
| 2017/0329523 A1* | 11/2017 | Gensler, Jr. | G06F 3/0659 |
| 2018/0253386 A1 | 9/2018 | Qiu et al. | |

FOREIGN PATENT DOCUMENTS

| | | | |
|---|---|---|---|
| CN | 103473314 A | | 12/2013 |
| CN | 103559027 A | | 2/2014 |
| CN | 104182508 A | | 12/2014 |
| CN | 105933376 A | | 9/2016 |
| CN | 106202548 A | * | 12/2016 |
| CN | 106202548 A | | 12/2016 |
| CN | 106980685 A | | 7/2017 |
| CN | 107092439 A | | 8/2017 |
| CN | 107463656 A | | 12/2017 |

\* cited by examiner

METHOD AND DEVICE FOR STORING DATA

CROSS-REFERENCE TO RELATED APPLICATIONS

This application claims priority to Chinese Patent Application No. 201711327679.5, filed on Dec. 13, 2017, titled "Method and Apparatus for Storing data," which is hereby incorporated by reference in its entirety.

TECHNICAL FIELD

Embodiments of the disclosure relate to the field of computer technology, specifically to the field of Internet technology, and more specifically to a method and apparatus for storing data.

BACKGROUND

Json (JavaScript Object Notation) is a lightweight data exchange format. The Json structure has been widely used in the fields such as software systems. At present, both the intersystem message transfer and extensible data structure expression are usually implemented using the Json structure. For retrieval within the knowledge graph, a node (i.e., an entity) and an edge (relationship) are usually expressed through the Json structure.

Usually, a considerable amount of data can be characterized by the Json structure. Data characterized by the Json structure may include key-value pairs, objects, and arrays.

SUMMARY

A method and an apparatus for storing data are provided according to embodiments of the disclosure.

In a first aspect, a method for storing data is provided according to an embodiment of the disclosure. The method includes: acquiring target data, the target data including at least one of following items: first key-value pair data, object data or array data, the key-value pair data including key data and value data, the object data including at least one piece of second key-value pair data, and the array data including at least one piece of object data; determining an object data number of the object data included in the target data, an array data number of the array data included in the target data, a first key-value pair data number of the first key-value pair data included in the target data, and a second key-value pair data number of the second key-value pair data included in the target data; determining a storage space for storing the target data based on the object data number, the array data number, the first key-value pair data number, and the second key-value pair data number; and storing the target data into the storage space.

In some embodiments, the storing the target data into the storage space includes: storing, for each piece of key-value pair data included in the target data, the key data included in the piece of key-value pair data and the value data included in the piece of key-value pair data into a storage area with contiguous addresses in a first preset storage area of the storage space.

In some embodiments, the method further includes: sorting the stored key data to obtain a key data sequence; determining a segment address of the first preset storage area; determining, for each piece of key data in the key data sequence, an offset address of a storage address of the piece of key data in the first preset storage area relative to the segment address to obtain an offset address sequence; and storing, for each offset address in the offset address sequence, the offset address into a second preset storage area in the storage space or a third preset storage area in the storage space.

In some embodiments, the storing the offset address into a second preset storage area in the storage space or a third preset storage area in the storage space includes: determining whether key data corresponding to the offset address is included in the first key-value pair data or the second key-value pair data; storing the offset address into the second preset storage area in the storage space if the key data corresponding to the offset address is included in the first key-value pair data; and storing the offset address into the third preset storage area in the storage space if the key data corresponding to the offset address is included in the second key-value pair data.

In some embodiments, the method further includes: acquiring at least one piece of data having a pre-established correlation with the target data; determining bidirectional index information between the target data and the at least one piece of data; and storing the bidirectional index information into a fourth preset storage area in the storage space.

In some embodiments, a storage address in the first preset storage area, a storage address in the second preset storage area, a storage address in the third preset storage area, and a storage address in the fourth preset storage area are contiguous.

In a second aspect, an apparatus for storing data is provided according to some embodiments of the disclosure. The apparatus includes: a first acquiring unit, configured for acquiring target data, the target data including at least one of following items: first key-value pair data, object data or array data, the key-value pair data including key data and value data, the object data including at least one piece of second key-value pair data, and the array data including at least one piece of object data; a first determining unit, configured for determining an object data number of the object data included in the target data, an array data number of the array data included in the target data, a first key-value pair data number of the first key-value pair data included in the target data, and a second key-value pair data number of the second key-value pair data included in the target data; a second determining unit, configured for determining a storage space for storing the target data based on the object data number, the array data number, the first key-value pair data number, and the second key-value pair data number; and a first storing unit, configured for storing the target data into the storage space.

In some embodiments, the first storing unit includes: a first storing module, configured for storing, for each piece of key-value pair data included in the target data, the key data included in the piece of key-value pair data and the value data included in the piece of key-value pair data into a storage area with contiguous addresses in a first preset storage area of the storage space.

In some embodiments, the apparatus further includes: a sorting unit, configured for sorting the stored key data to obtain a key data sequence; a third determining unit, configured for determining a segment address of the first preset storage area; a fourth determining unit, configured for determining, for each piece of key data in the key data sequence, an offset address of a storage address of the piece of key data in the first preset storage area relative to the segment address to obtain an offset address sequence; and a second storing unit, configured for storing, for each offset address in the offset address sequence, the offset address into a second preset storage area in the storage space or a third preset storage area in the storage space.

In some embodiments, the second storing unit includes: a second storing module, configured for determining whether key data corresponding to the offset address is included in the first key-value pair data or the second key-value pair data; storing the offset address into the second preset storage area in the storage space if the key data corresponding to the offset address is included in the first key-value pair data; and storing the offset address into the third preset storage area in the storage space if the key data corresponding to the offset address is included in the second key-value pair data.

In some embodiments, the apparatus further includes: a second acquiring unit, configured for acquiring at least one piece of data having a pre-established correlation with the target data; a fifth determining unit, configured for determining bidirectional index information between the target data and the at least one piece of data; and a third storing unit, configured for storing the bidirectional index information into a fourth preset storage area in the storage space.

In some embodiments, a storage address in the first preset storage area, a storage address in the second preset storage area, a storage address in the third preset storage area, and a storage address in the fourth preset storage area are contiguous.

In a third aspect, an embodiment of the disclosure provides a device for storing data, including: one or more processors; and a memory for storing one or more programs, where the one or more programs, when executed by the one or more processors, cause the one or more processors to implement the method according to any one embodiment of the method for storing data.

In a fourth aspect, a computer readable storage medium storing a computer program is provided according to an embodiment of the disclosure, where the program implements, when executed by a processor, the method according to any one embodiment of the method for storing data.

A method and an apparatus for storing data according to embodiments of the disclosure acquire target data, then determine an object data number of object data included in the target data, an array data number of array data included in the target data, a first key-value pair data number of first key-value pair data included in the target data, and a second key-value pair data number of second key-value pair data included in the target data, then determine a storage space for storing the target data based on the object data number, the array data number, the first key-value pair data number, and the second key-value pair data number, and finally store the target data into the storage space, thereby enriching the data storage method, and contributing to reducing the storage space occupied by data.

BRIEF DESCRIPTION OF THE DRAWINGS

By reading the detailed description on the non-limiting embodiments with reference to the accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
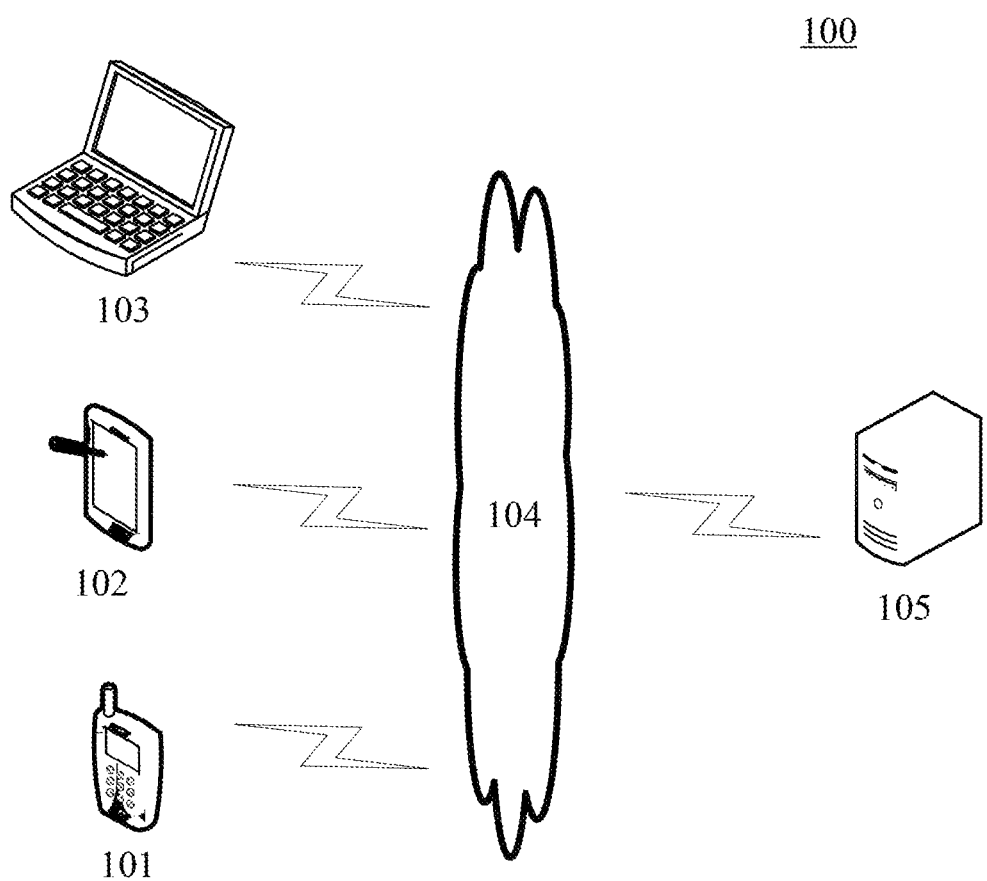
FIG. 1 is an architectural diagram of an exemplary system in which the present disclosure may be implemented.

FIG. 1 shows an exemplary architecture of a system 100 in which a method for storing data or an apparatus for storing data is implemented according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various client applications, such as webpage browser applications, shopping applications, search applications, instant messaging tools, and social platform software may be installed on the terminal devices 101, 102 and 103.

The terminal devices 101, 102 and 103 may be various electronic devices having display screens and supporting webpage browsing, including but not limited to, smart phones, tablet computers, e-book readers, laptop computers and desktop computers.

The server 105 may be a server providing various services, for example, a backend data processing server providing a support to data, e.g., the content searched for in the terminal devices 101, 102 or 103. The backend data processing server may analyze the received data.

It should be noted that the method for storing data according to the embodiments of the present disclosure is generally executed by the server 105. Accordingly, the apparatus for storing data is generally installed on the server 105.

It should be appreciated that the numbers of the terminal devices, networks and servers in FIG. 1 are merely illustrative. Any number of terminal devices, networks and servers may be provided based on the actual requirements.

Figure 2:
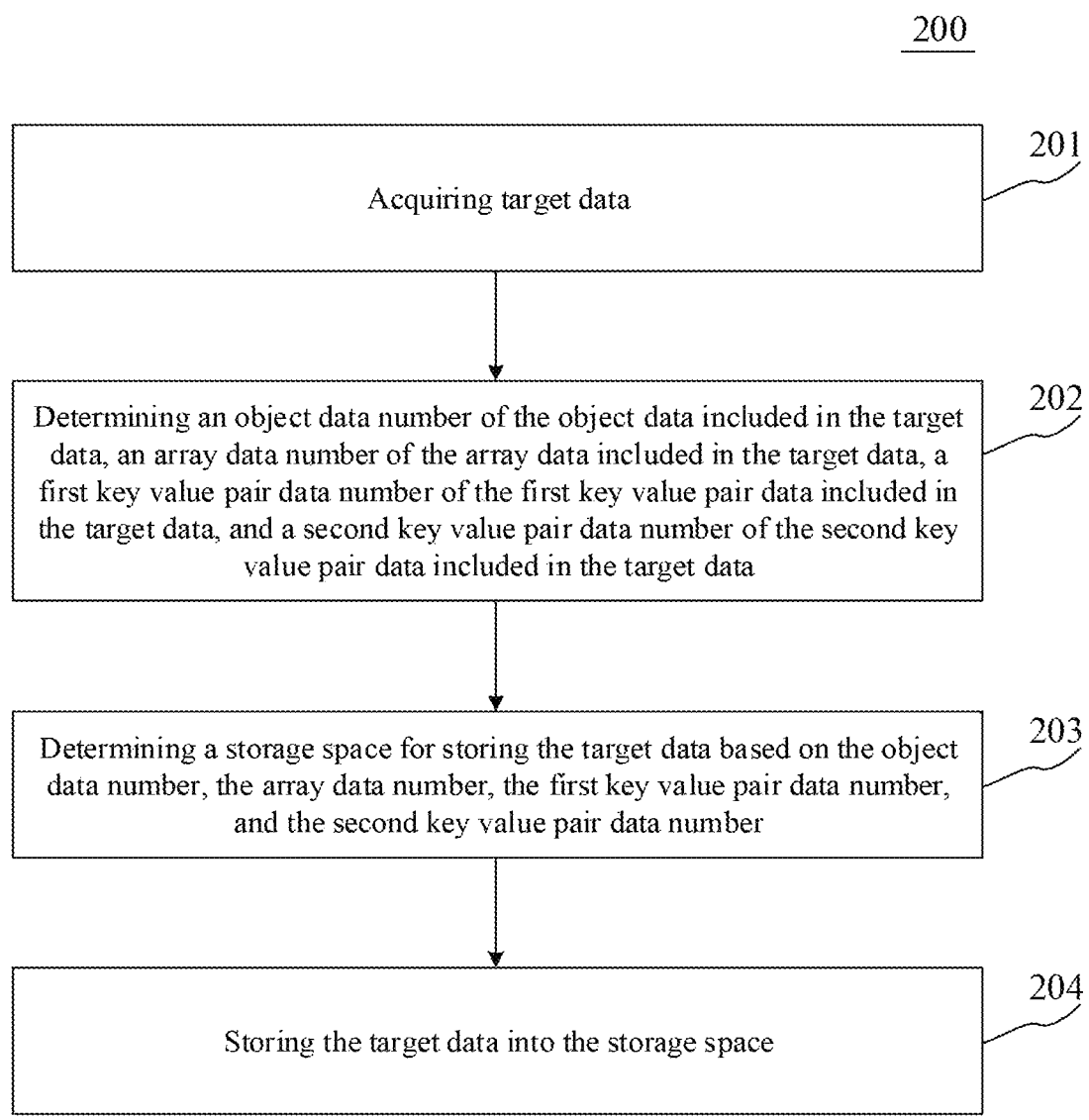
FIG. 2 is a flowchart of a method for storing data according to an embodiment of the disclosure.

Reference is made to FIG. 2, which shows a flow 200 of a method for storing data according to an embodiment of the disclosure. The method for storing data includes steps 201 to 204.

Step 201 includes: acquiring target data.

In the embodiment, an electronic device (e.g., the server shown in FIG. 1) in which the method for storing data is implemented may acquire target data by wired connection or wireless connection. Here, the target data include at least one of: first key-value pair data, object data or array data. The key-value pair data include key data and value data, the object data include at least one piece of second key-value pair data, and the array data include at least one piece of object data. The target data may be data having a Json structure, or data that may be characterized through the Json structure. The target data may be data sent by the terminal device (e.g., the terminal device shown in FIG. 1), or data pre-stored in the electronic device. The first key-value pair data is key-value pair data that is not included in the object data. The second key-value pair data is key-value pair data included in the object data.

Figure 3:
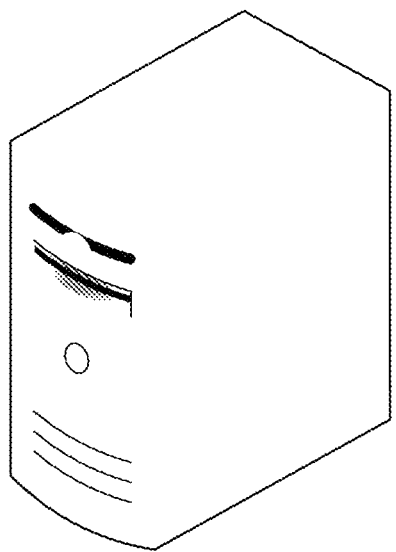
FIG. 3 is a schematic diagram of an application scenario of a method for storing data according to the disclosure.
Figure 3:
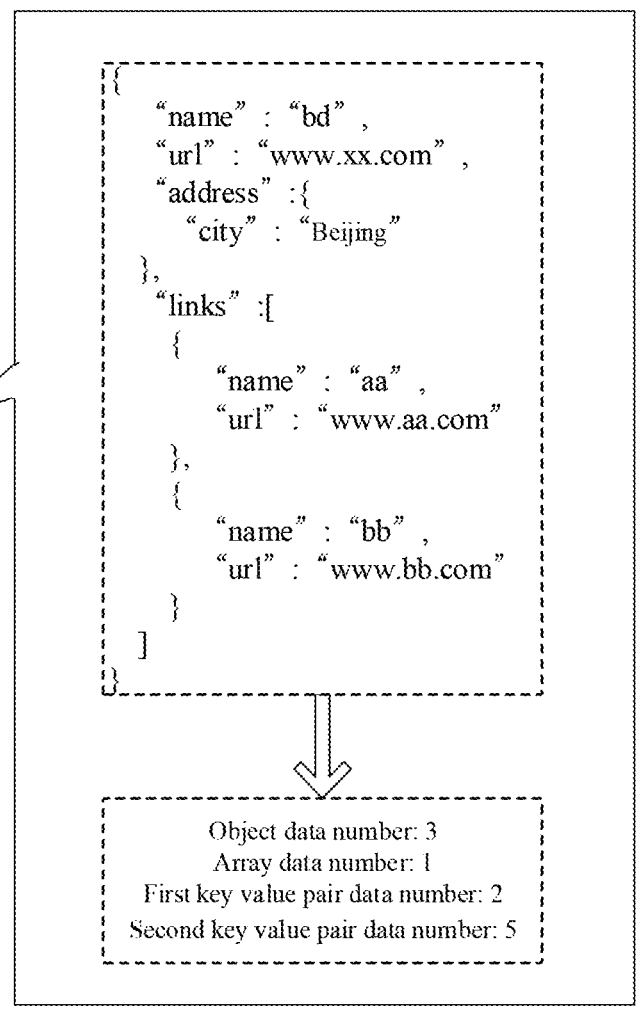

As an example, reference is made to FIG. 3. Here, the target data acquired by the server (i.e., the electronic device) is:

```
{
"name": "bd",
"url": "www.xx.com",
"address": {
"city": "Beijing"
},
"links": [
{
"name": "aa",
"url": "www.aa.com"
},
{
"name": "bb",
"url": "www.bb.com"
}
]
}
```

Here, the target data include first key-value pair data ""name": "bd" "and" "url": "www.xx.com""; second key-value pair data ""city": "Beijing"", ""name": "aa"", ""url": "www.aa.com"", ""name": "bb" "and" "url": "www.bb.com""; object data "{"city": "Beijing"}", "{"name": "aa", "url": "www.aa.com"}"and"{"name": "bb", "url": "www.bb.com"}"; and array data "[{"name": "aa", "url": "www.aa.com",}, {"name": "bb", "url": "www.bb.com"}]". Taking the key-value pair data ""name": "bd"" as an example, key data included in the key-value pair data is "name", and value data included in the key-value pair data are "bd".

Step 202 includes: determining an object data number of the object data included in the target data, an array data number of the array data included in the target data, a first key-value pair data number of the first key-value pair data included in the target data, and a second key-value pair data number of the second key-value pair data included in the target data.

In the embodiment, the electronic device may determine the object data number of the object data included in the target data, the array data number of the array data included in the target data, the first key-value pair data number of the first key-value pair data included in the target data, and the second key-value pair data number of the second key-value pair data included in the target data.

In practice, taking Json data in FIG. 3 as an example, the electronic device may determine the array data number of the array data included in the target data by determining the number of the square brackets (i.e., [ ]) included in the curly braces in the outermost layer (i.e., { } in the outermost layer in the figure); determine the object data number of the object data included in the target data by determining the curly brace pair (i.e., a pair of curly braces { }) number included in the curly braces in the outermost layer; determine the first key-value pair data number of the first key-value pair data included in the target data by determining the number of key-value pair data that are included in the curly braces in the outermost layer and are excluded in the object data; and determine the second key-value pair data number of the second key-value pair data included in the target data by determining the number of key-value pair data included in the object data. It should be noted that a skilled person may establish methods for determining the numbers vis-a-vis different target data, which are not limited in the embodiment of the disclosure.

As an example, further reference is made to FIG. 3. Here, the server determines the object data number as 3, the array data number as 1, the first key-value pair data number as 2, and the second key-value pair data number as 5 as per the above method.

Step 203 includes: determining a storage space for storing the target data based on the object data number, the array data number, the first key-value pair data number, and the second key-value pair data number.

In the embodiment, the electronic device may determine the storage space for storing the target data based on the object data number, the array data number, the first key-value pair data number, and the second key-value pair data number determined in the step 202.

In some optional implementations of the embodiment, a skilled person may preset the size of the storage space for storing the object data, the array data, and the key-value pair data. As an example, a size of a storage space for storing one piece of object data may be set as "128 bytes", a size of a storage space for storing one piece of array data may be set as "512 bytes", and a size of a storage space for storing one piece of key-value pair data may be set as "32 bytes", and so on. On this basis, the electronic device may determine the storage space for storing the target data as "1120 bytes" by calculating 128*3+512*1+32*(2+5). Then, the electronic device may determine a storage space (i.e., a storage space having a size larger than or equal to the above storage space) for storing the target data based on the size of the determined storage space. It should be noted that the size of the storage space may be determined by a skilled person as needed.

In some optional implementations of the embodiment, the storage space for storing the target data may alternatively be determined by: after the presetting the size of the storage space for storing the object data, the array data, and the key-value pair data by a skilled person and the electronic device determines the size of the storage space for storing the target data, the size of the storage space is expanded in a preset way (e.g., 1.1-fold expansion), and the expansion result is used as the size of the finally determined storage space. Then, the electronic device may determine the storage space for storing the target data based on the size of the finally determined storage space.

Step 204 includes: storing the target data into the storage space.

In the embodiment, the electronic device may store the target data into the storage space based on the target data acquired in the step 201 and the storage space determined in the step 203.

In some optional implementations of the embodiment, the electronic device may store the target data into the storage space in a text form.

In some optional implementations of the embodiment, the electronic device may alternatively firstly convert the target data into a character string, and then store the converted character string.

The method according to the above embodiments of the disclosure acquires target data, then determines an object data number of object data included in the target data, an array data number of array data included in the target data, a first key-value pair data number of first key-value pair data included in the target data, and a second key-value pair data number of second key-value pair data included in the target data, then determines a storage space for storing the target data based on the object data number, the array data number, the first key-value pair data number, and the second key-value pair data number, and finally stores the target data into the storage space, thereby enriching the data storage method, and contributing to reducing the storage space occupied by data.

Figure 4:
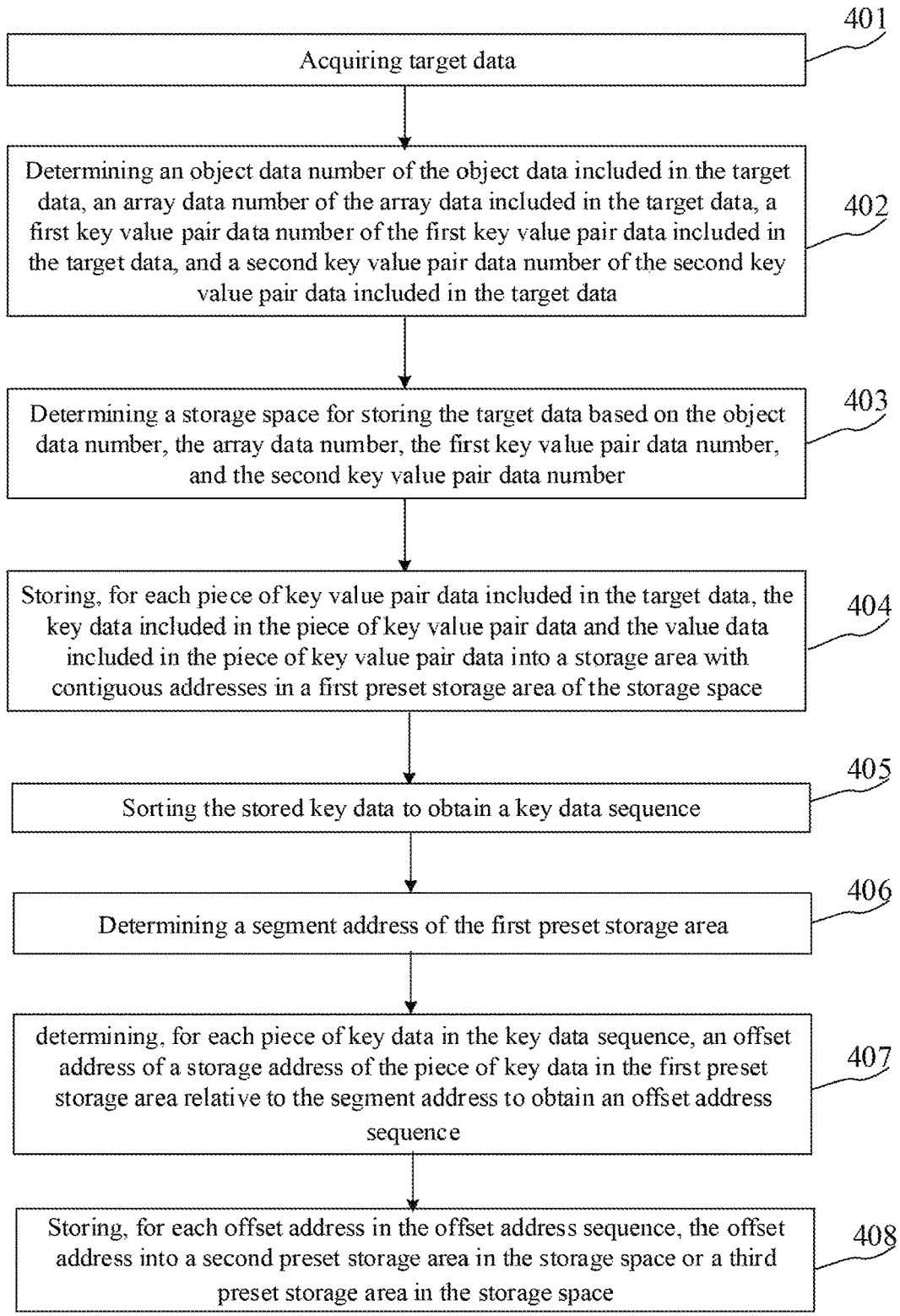
FIG. 4 is a flowchart of a method for storing data according to another embodiment of the disclosure.

Reference is made to FIG. 4, which shows a flow 400 of a method for storing data according to another embodiment of the disclosure. The flow 400 of the method for storing data includes steps 401 to 408.

Step 401 includes: acquiring target data.

The step 401 in the embodiment is basically consistent with the step 201 in the embodiment corresponding to FIG. 2, and is not repeated any more here.

Step 402 includes: determining an object data number of the object data included in the target data, an array data number of the array data included in the target data, a first key-value pair data number of the first key-value pair data included in the target data, and a second key-value pair data number of the second key-value pair data included in the target data.

The step 402 in the embodiment is basically consistent with the step 202 in the embodiment corresponding to FIG. 2, and is not repeated any more here.

Step 403 includes: determining a storage space for storing the target data based on the object data number, the array data number, the first key-value pair data number, and the second key-value pair data number.

The step 403 in the embodiment is basically consistent with the step 203 in the embodiment corresponding to FIG. 2, and is not repeated any more here.

Step 404 includes: storing, for each piece of key-value pair data included in the target data, the key data included in the piece of key-value pair data and the value data included in the piece of key-value pair data into a storage area with contiguous addresses in a first preset storage area of the storage space.

In the embodiment, for each piece of key-value pair data included in the target data, the electronic device may store the key data included in the piece of key-value pair data and the value data included in the piece of key-value pair data into the storage area with contiguous addresses in the first preset storage area of the storage space. Here, the first preset storage area may be a storage area determined by a skilled person based on the number of the piece of key data and the number of the piece of value data included in the target data and capable of storing the key data and the value data included in the target data. Key data and value data included in a given piece of key-value pair data are stored into a storage area with contiguous addresses in the first preset storage area (i.e., a last address of the key data is adjacent to a first address of the value data).

Figure 5A:
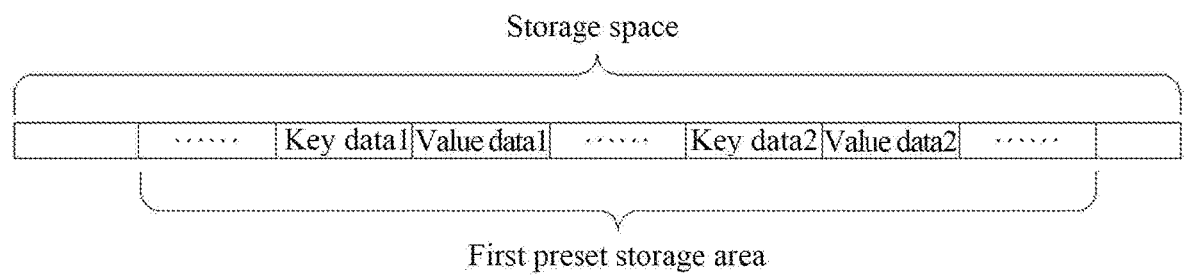
FIG. 5A is a schematic diagram of a storage structure of a first preset storage space of a method for storing data according to the disclosure.

As an example, reference is made to FIG. 5A. Key data 1 and value data 1 are included in a given piece of key-value pair data; and key data 2 and value data 2 are included in another piece of key-value pair data. Storage addresses of the key data 1 and the value data 1 are contiguous; and storage addresses of the key data 2 and the value data 2 are contiguous. For example, if the storage address of the key data 1 is "0020H-0024H", then the storage address of the value data 1 may be "0025H-0033H".

Figure 5B:
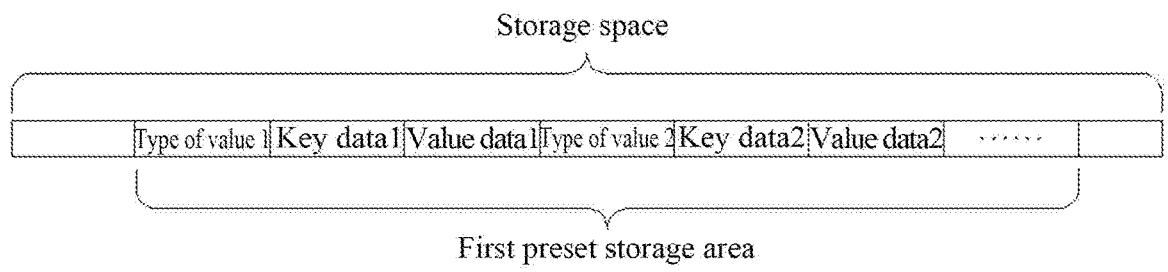
FIG. 5B is a schematic diagram of a storage structure of another first preset storage space of a method for storing data according to the disclosure.

In some optional implementations of the embodiment, data type (for example, an integer type (int), and a string type (string)) information of value data included in key-value pair data may also be stored into a storage area contiguous with the storage area of the key-value pair data. String type information may be characterized by "int" or "string", or characterized by a preset and predefined identifier. For example, "1" may be used for denoting the data type of the value data being "int", i.e., the integer type. Referring to FIG. 5B, the electronic device may store the type of the value 1 (i.e., data type information of the value data 1) into a storage space prior to the storage space of the key data 1 contiguous with the storage address of the key data 1. Optionally, the value data 1 and data type information of value data of another piece of key-value pair data may be stored in contiguous storage spaces. Therefore, in FIG. 5B, the electronic device stores the type of the value 1, the key data 1, the value data 1, the type of the value 2, the key data 2, and the value data 2 in contiguous storage spaces.

It may be appreciated that, in key-value pair data, key data is usually of a string type, and the size of a storage space occupied by the key data is constant. The data type of value data is non-constant, and the size of a storage space occupied by the value data is also non-constant. By the above form of storing data type information of value data, the distribution of the storage space may be more targeted for each piece of key-value pair data (including key data and value data included in the key-value pair data) to improve the use efficiency of the storage space. Furthermore, data type information of value data, value data, key data, and data type information of value data, value data and key data of another piece of data are stored in contiguous storage spaces to more effectively utilize the storage space.

Step 405 includes: sorting the stored key data to obtain a key data sequence.

In the embodiment, the electronic device may sort the stored key data included in the target data to obtain a key data sequence. Optionally, the electronic device may obtain the key data sequence by sorting in an ascending order, in a descending order or in other order set by a skilled person.

Step 406 includes: determining a segment address of the first preset storage area.

In the embodiment, the electronic device may determine the segment address of the first preset storage area. Here, the segment address is a first address of the first preset storage area, i.e., a first storage address for storing data in the first preset storage area.

Step 407 includes: determining, for each piece of key data in the key data sequence, an offset address of a storage address of the piece of key data in the first preset storage area relative to the segment address to obtain an offset address sequence.

In the embodiment, for each piece of key data in the key data sequence, the electronic device may determine the offset address of the storage address of the piece of key data in the first preset storage area relative to the segment address to obtain the offset address sequence. Here, the offset address is an offset address of the storage address of key data in the first preset storage area relative to the segment address. As an example, if the storage address of key data in the first preset storage area is "008A2H", and the segment address is "00880H", then the offset address is "22H". Alternatively, the electronic device may store each offset address in the offset address sequence obtained in the step 407 into a preset storage area. Here, the preset storage area may be included in a part of the storage space for storing target data predetermined by a skilled person, or in a storage space independent of the storage space for storing target data.

Step 408 includes: storing, for each offset address in the offset address sequence, the offset address into a second preset storage area in the storage space or a third preset storage area in the storage space.

In the embodiment, for each offset address in the offset address sequence, the electronic device may store the offset address into the second preset storage area in the storage space or the third preset storage area in the storage space. Here, the electronic device may store each offset address in the offset address sequence obtained in the step 407 into the second preset storage area in the storage space or the third preset storage area in the storage space. Here, the second preset storage area is a storage space predetermined by a skilled person, and the third preset storage area is a storage space predetermined by a skilled person and different from the second preset storage area.

It may be appreciated that after sorting the key data and determining the offset address sequence, the electronic device may search for data through a binary method (a searching algorithm) to improve the searching efficiency.

In some optional implementations of the embodiment, the storing the offset address into a second preset storage area in the storage space or a third preset storage area in the storage space includes: determining key data corresponding to the offset address being included in the first key-value pair data or the second key-value pair data; storing the offset address into the second preset storage area in the storage space if the key data corresponding to the offset address is included in the first key-value pair data; and storing the offset address into the third preset storage area in the storage space if the key data corresponding to the offset address is included in the second key-value pair data.

As an example, following target data is taken as an example:

```
{
 "name": "bd",
 "address": {
  "city": "Beijing"
 }
}.
```

The electronic device may determine whether the key data is included in the first key-value pair data or the second key-value pair data by determining the number of curly braces enclosing the key data. For example, the electronic device may determine that key data enclosed by one pair of curly braces is included in the first key-value pair data, and key data enclosed by two pair of curly braces is included in the second key-value pair data. Therefore, the electronic device may determine the key data "name" being included in the first key-value pair data, and the key data "city" being included in the second key-value pair data. Then, the electronic device may store an offset address corresponding to the key data "name" (i.e., the offset address of the storage address of the key-value pair data including the key data "name" in the first preset storage area relative to the first preset storage area) into the second preset storage area, and store an offset address corresponding to the key data "city" into the third preset storage area in the storage space.

It should be noted that a skilled person may set how to determine whether the key data corresponding to the offset address is included in the first key-value pair data or the second key-value pair data based on the practical situation (for example, based on the characteristic, structure, etc. of the acquired target data), which is not limited in the disclosure.

Figure 5C:
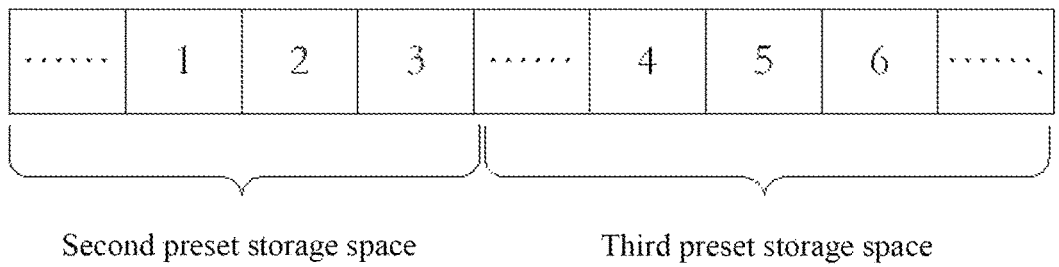
FIG. 5C is a schematic diagram of a storage structure of a storage space of a method for storing data according to the disclosure.

In some optional implementations of the embodiment, the storage space for storing the offset address may be storage spaces of an equal size (for example, the size of each storage space for storing the offset address is 4 bytes). As an example, reference is made to FIG. 5C. A storage space 1, a storage space 2, a storage space 3, a storage space 4, a storage space 5 and a storage space 6 are used for storing the offset address, and the size of each of the storage spaces is 4 bytes. It may be appreciated that, the determining the storage address of the offset address may be simplified when the storage spaces for storing the offset address have an equal size. As an example, a storage address of an offset address of a second element (for example, object data) included in array data may be determined by calculating a product of two and the size of the storage space (for example, 4 bytes), and then adding a segment address to the obtained product. Then the electronic device may determine the offset address of the second element included in the array data based on the storage address, and then determine the second element included in the array data. It should be noted that the existing technologies usually determine elements in an array based on pointer jump. In contrast, the way provided by embodiments of the disclosure greatly reduces the number of pointer jump and the number of operations, thereby reducing the performance consumption.

In some optional implementations of the embodiment, if the key data corresponding to the offset address is included in the first key-value pair data, then the electronic device may alternatively store an offset address of the value data included in the first key-value pair data in the first preset storage area and the data type information of the value data included in the first key-value pair data into the second preset storage area; and if the key data corresponding to the offset address is included in the second key-value pair data, then the electronic device may alternatively determine an offset address of the offset address in the third preset storage area (i.e., an offset address of the storage address of the offset address in the second preset storage area relative to the segment address of the third preset storage area), store the offset address in the third preset storage area into the second preset storage area, and store the number of the key data included in the object data including the key data corresponding to the offset address into the second preset storage area.

In some optional implementations of the embodiment, the method further includes: acquiring at least one piece of data having a pre-established correlation with the target data; determining bidirectional index information between the target data and the at least one piece of data; and storing the bidirectional index information into a fourth preset storage area in the storage space. Here, the at least one piece of data having the pre-established correlation with the target data may be, e.g., attribute data of the target data. The fourth preset storage area is a storage area preset by a skilled person.

As an example, the target data may be used for characterizing a node (i.e., an entity) in a knowledge graph/vaul (also known as a mapping knowledge domain), and the at least one piece of data having the pre-established correlation with the target data may be used for characterizing an edge (i.e., relationship) of the node in the mapping knowledge domain. The bidirectional index information is used for establishing a correlation between the target data and the at least one piece of data (the correlation is used for determining the at least one piece of data based on the target data, and may be expressed as index information from the target data to correlation data) and a correlation between the at least one piece of data and the target data (the correlation is used for determining the target data based on each of the at least one piece of data, and may be expressed as index information from the correlation data to the target data). As an example, the bidirectional index information may include an identifier (ID) of the at least one piece of data, and the identifier is used for uniquely identifying each of the at least one piece of data; and the bidirectional index information may alternatively be descriptive information of the at least one piece of data. As an example, if the target data is ""xiaoming": "male"" (characterizing information xiaoming: male), and data having a pre-established correlation with the target data is ""xiaohua": "female"" (characterizing information xiaohua: female), then the bidirectional index information characterizing the relationship between Xiaohua and Xiaoming may include "label: husband" (characterizing Xiaoming is Xiaohua's husband) and "label: wife" (characterizing Xiaohua is Xiaoming's wife). Then the electronic device may store the bidirectional index information into the fourth storage space.

In some optional implementations of the embodiment, the electronic device may alternatively store the index information from the target data to the correlation data, and the index information from the correlation data to the target data into different sub-storage spaces of the fourth storage space.

In some optional implementations of the embodiment, a storage address in the first preset storage area, a storage address in the second preset storage area, a storage address in the third preset storage area, and a storage address in the fourth preset storage area are contiguous.

Figure 5D:
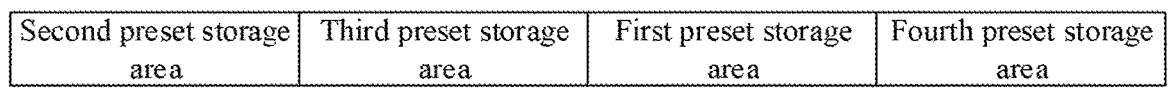
FIG. 5D is a schematic diagram of contiguously distributed storage spaces of a method for storing data according to the disclosure.

It may be appreciated that, when the storage addresses are contiguous storage addresses, the use efficiency of the storage space may be improved. As an example, referring to FIG. 5D, the storage areas are distributed in an order of the second preset storage area, the third preset storage area, the first preset storage area and the fourth preset storage area, and for the adjacent areas, the addresses are contiguous.

As can be seen from FIG. 4, compared with the embodiment corresponding to FIG. 2, a flow 400 of a method for storing data according to the embodiment highlights storing the target data. Thus, with more ways for storing target data, the solution according to the embodiment may achieve more abundant storage modes, reduce the storage spaces occupied by stored target data, reduce the internal memory occupied during target data retrieval, and simplify the analysis process when reading data.

Figure 6:
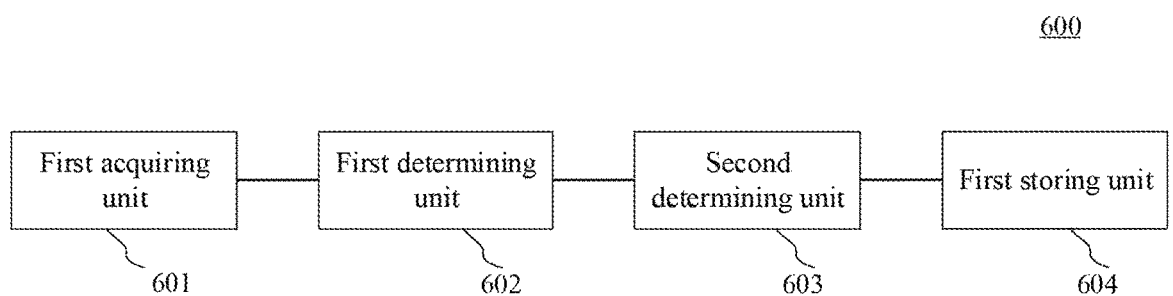
FIG. 6 is a structural schematic diagram of an apparatus for storing data according to an embodiment of the disclosure.

Reference is made to FIG. 6. As an implementation of the method shown in the figures, an apparatus for storing data is provided according to an embodiment of the disclosure. The embodiment of the apparatus corresponds to the embodiment of the method shown in FIG. 2, and the apparatus may be specifically applied in a variety of electronic devices.

As shown in FIG. 6, an apparatus 600 for storing data according to the embodiment includes: a first acquiring unit 601, a first determining unit 602, a second determining unit 603 and a first storing unit 604. Here, the first acquiring unit 601 is configured for acquiring target data, where the target data includes at least one: first key-value pair data, object data or array data, the key-value pair data includes key data and value data, the object data includes at least one piece of second key-value pair data, and the array data include at least one piece of object data; the first determining unit 602 is configured for determining an object data number of the object data included in the target data, an array data number of the array data included in the target data, a first key-value pair data number of the first key-value pair data included in the target data, and a second key-value pair data number of the second key-value pair data included in the target data; the second determining unit 603 is configured for determining a storage space for storing the target data based on the object data number, the array data number, the first key-value pair data number, and the second key-value pair data number; and the first storing unit 604 is configured for storing the target data into the storage space.

In the embodiment, the first acquiring unit 601 of the apparatus 600 for storing data may acquire target data by wired connection or wireless connection. Here, the target data include at least one: first key-value pair data, object data or array data. The key-value pair data include key data and value data, the object data include at least one piece of second key-value pair data, and the array data include at least one piece of object data. The target data may be data having a Json structure, or data that may be characterized through the Json structure. The target data may be data sent by the terminal device (e.g., the terminal device shown in FIG. 1), or data pre-stored in the electronic device. The first key-value pair data is key-value pair data excluded in the object data. The second key-value pair data is key-value pair data included in the object data.

In the embodiment, based on the target data acquired by the first acquiring unit 601, the first determining unit 602 may determine the object data number of the object data included in the target data, the array data number of the array data included in the target data, the first key-value pair data number of the first key-value pair data included in the target data, and the second key-value pair data number of the second key-value pair data included in the target data.

In the embodiment, based on the object data number, the array data number, the first key-value pair data number, and the second key-value pair data number determined by the first determining unit 602, the second determining unit 603 may determine the storage space for storing the target data.

In the embodiment, the first storing unit 604 may store the target data into the storage space based on the target data acquired by the first acquiring unit 601 and the storage space determined by the second determining unit 603.

In some optional implementations of the embodiment, the first storing unit includes: a first storing module (not shown in the figure) configured for storing, for each piece of key-value pair data included in the target data, the key data included in the piece of key-value pair data and the value data included in the piece of key-value pair data into a storage area with contiguous addresses in a first preset storage area of the storage space.

In some optional implementations of the embodiment, the apparatus further includes: a sorting unit (not shown in the figure) configured for sorting the stored key data to obtain a key data sequence; a third determining unit (not shown in the figure) configured for determining a segment address of the first preset storage area; a fourth determining unit (not shown in the figure) configured for determining, for each piece of key data in the key data sequence, a first offset address of a storage address of the piece of key data in the first preset storage area relative to the segment address to obtain a first offset address sequence; and a second storing unit (not shown in the figure) configured for storing, for each first offset address in the first offset address sequence, the first offset address into a second preset storage area in the storage space or a third preset storage area in the storage space.

In some optional implementations of the embodiment, the second storing unit includes: a second storing module (not shown in the figure) configured for determining whether key data corresponding to the first offset address is included in the first key-value pair data or the second key-value pair data; storing the first offset address into the second preset storage area in the storage space if the key data corresponding to the first offset address is included in the first key-value pair data; and storing the first offset address into the third preset storage area in the storage space if the key data corresponding to the first offset address is included in the second key-value pair data.

In some optional implementations of the embodiment, the apparatus further includes: a second acquiring unit (not shown in the figure) configured for acquiring at least one piece of data having a pre-established correlation with the target data; a fifth determining unit (not shown in the figure) configured for determining bidirectional index information between the target data and the at least one piece of data; and a third storing unit, configured for storing the bidirectional index information into a fourth preset storage area in the storage space.

In some optional implementations of the embodiment, a storage address in the first preset storage area, a storage address in the second preset storage area, a storage address in the third preset storage area, and a storage address in the fourth preset storage area are contiguous.

The apparatus according to the above embodiments of the disclosure acquires target data by the first acquiring unit 601, then determines an object data number of object data included in the target data, an array data number of array data included in the target data, a first key-value pair data number of first key-value pair data included in the target data, and a second key-value pair data number of second key-value pair data included in the target data by the first determining unit 602, then determines a storage space for storing the target data by the second determining unit 603 based on the object data number, the array data number, the first key-value pair data number, and the second key-value pair data number, and finally stores the target data into the storage space by the first storing unit 604, thereby enriching the data storage ways, and contributing to reducing the storage space occupied by data.

Figure 7:
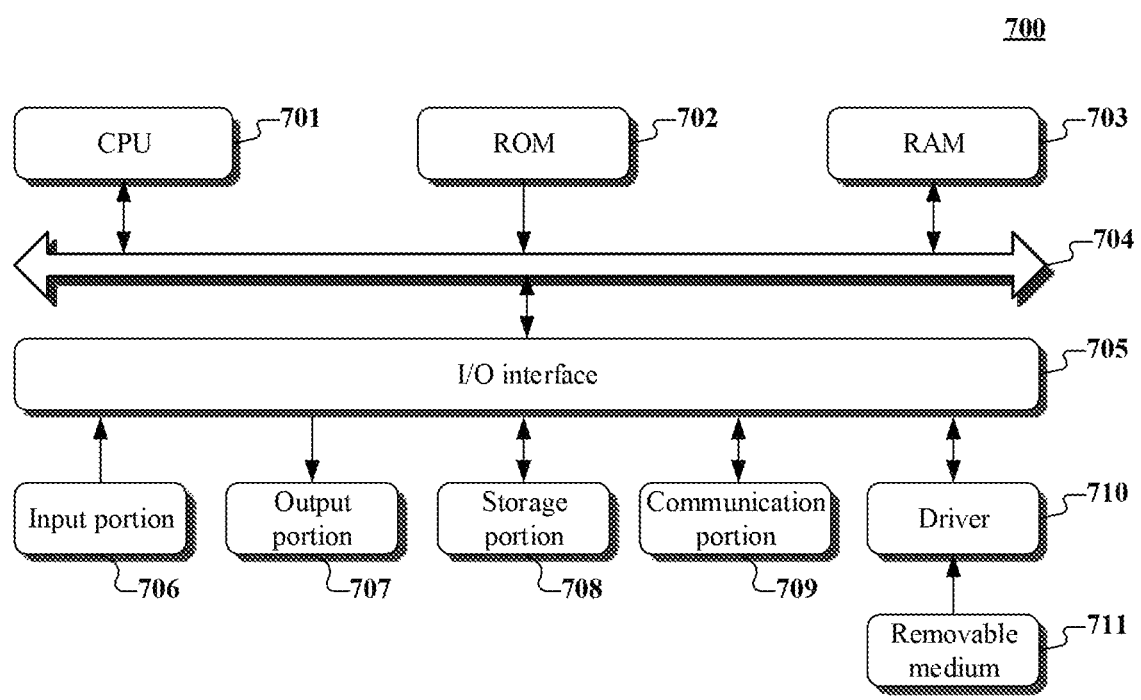
FIG. 7 is a structural schematic diagram of a computer system adapted to implement a server according to an embodiment of the disclosure.

Referring to FIG. 7, a schematic structural diagram of a computer system 700 adapted to implement a server of the embodiments of the present disclosure is shown As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 including a cathode ray tube (CRT), a liquid crystal display device (LCD), a speaker etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an obtaining unit, a first determining unit, a second determining unit and a storage unit, where the names of these units or modules do not in some cases constitute a limitation to such units themselves. For example, the obtaining unit may also be described as "a unit for obtaining target data.

In another aspect, the present disclosure further provides a computer-readable medium. The computer-readable medium may be the computer-readable medium included in the server in the above described embodiments, or a stand-alone computer-readable medium not assembled into the apparatus. The computer-readable medium stores one or more programs. The one or more programs, when executed by a device, cause the device to: acquire target data, the target data including at least one of following items: first key-value pair data, object data or array data, the key-value pair data including key data and value data, the object data including at least one piece of second key-value pair data, and the array data including at least one piece of object data; determine an object data number of the object data included in the target data, an array data number of the array data included in the target data, a first key-value pair data number of the first key-value pair data included in the target data, and a second key-value pair data number of the second key-value pair data included in the target data; determine a storage space for storing the target data based on the object data number, the array data number, the first key-value pair data number, and the second key-value pair data number; store the target data into the storage space.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for storing data, comprising:
    acquiring target data, the target data including at least one of following items: first key-value pair data, object data or array data, the first key-value pair data being not included in the object data, the object data including at least one piece of second key-value pair data, and the array data including at least one piece of object data, wherein each of the first key-value pair data and the second key-value pair data includes key data and value data, and at least one piece of second key-value pair data included in a given piece of object data correspond to a given object;
    determining an object data number of pieces of the object data included in the target data, an array data number of pieces of the array data included in the target data, a first key-value pair data number of pieces of the first key-value pair data included in the target data, and a second key-value pair data number of pieces of the second key-value pair data included in the target data;
    determining a storage space for storing the target data based on the object data number, the array data number, the first key-value pair data number, and the second key-value pair data number; and
    storing the target data into the storage space, wherein the storing the target data into the storage space comprises;
        storing, for each piece of key-value pair data included in the target data, the key data included in the each piece of key-value pair data and the value data included in the each piece of key-value pair data into a storage area with contiguous addresses in a first preset storage area of the storage space;
        sorting the stored key data to obtain a key data sequence;
        determining a segment address of the first preset storage area;
        determining, for each piece of key data in the key data sequence, an offset address of a storage address of the each piece of key data in the first preset storage area relative to the segment address to obtain an offset address sequence; and
        storing, for each offset address in the offset address sequence, the each offset address into a second preset storage area in the storage space or a third preset storage area in the storage space, wherein the storing the each offset address into a second preset storage area in the storage space or a third preset storage area in the storage space comprises:
            determining whether key data corresponding to the each offset address is included in the first key-value pair data or the second key-value pair data; storing the each offset address into the second preset storage area in the storage space if the key data corresponding to the each offset address is included in the first key-value pair data; and storing the each offset address into the third preset storage area in the storage space if the key data corresponding to the each offset address is included in the second key-value pair data.

2. The method according to claim 1, further comprising:
acquiring at least one piece of data having a pre-established correlation with the target data;
determining bidirectional index information between the target data and the at least one piece of data; and
storing the bidirectional index information into a fourth preset storage area in the storage space.

3. The method according to claim 2, wherein a storage address in the first preset storage area, a storage address in the second preset storage area, a storage address in the third preset storage area, and a storage address in the fourth preset storage area are contiguous.

4. An apparatus for storing data, comprising:
at least one processor; and
a memory storing instructions, the instructions when executed by the at least one processor, cause the at least one processor to perform operations, the operations comprising:
acquiring target data, the target data including at least one of following items: first key-value pair data, object data or array data, the first key-value pair data being not included in the object data, the object data including at least one piece of second key-value pair data, and the array data including at least one piece of object data, wherein each of the first key-value pair data and the second key-value pair data includes key data and value data, and at least one piece of second key-value pair data included in a given piece of object data correspond to a given object;
determining an object data number of pieces of the object data included in the target data, an array data number of pieces of the array data included in the target data, a first key-value pair data number of pieces of the first key-value pair data included in the target data, and a second key-value pair data number of pieces of the second key-value pair data included in the target data;
determining a storage space for storing the target data based on the object data number, the array data number, the first key-value pair data number, and the second key-value pair data number; and
storing the target data into the storage space, wherein the storing the target data into the storage space comprises;
storing, for each piece of key-value pair data included in the target data, the key data included in the each piece of key-value pair data and the value data included in the each piece of key-value pair data into a storage area with contiguous addresses in a first preset storage area of the storage space;
sorting the stored key data to obtain a key data sequence;
determining a segment address of the first preset storage area;
determining, for each piece of key data in the key data sequence, an offset address of a storage address of the each piece of key data in the first preset storage area relative to the segment address to obtain an offset address sequence; and
storing, for each offset address in the offset address sequence, the each offset address into a second preset storage area in the storage space or a third preset storage area in the storage space, wherein the storing the each offset address into a second preset storage area in the storage space or a third preset storage area in the storage space comprises:
determining whether key data corresponding to the each offset address is included in the first key-value pair data or the second key-value pair data; storing the each offset address into the second preset storage area in the storage space if the key data corresponding to the each offset address is included in the first key-value pair data; and storing the each offset address into the third preset storage area in the storage space if the key data corresponding to the each offset address is included in the second key-value pair data.

5. The apparatus according to claim 4, wherein the operations further comprise:
acquiring at least one piece of data having a pre-established correlation with the target data;
determining bidirectional index information between the target data and the at least one piece of data; and
storing the bidirectional index information into a fourth preset storage area in the storage space.

6. The apparatus according to claim 5, wherein a storage address in the first preset storage area, a storage address in the second preset storage area, a storage address in the third preset storage area, and a storage address in the fourth preset storage area are contiguous.

7. A non-transitory computer medium, storing a computer program, wherein the program, when executed by a processor, causes the processor to perform operations, the operations comprising:
acquiring target data, the target data including at least one of following items: first key-value pair data, object data or array data, the first key-value pair data being not included in the object data, the object data including at least one piece of second key-value pair data, and the array data including at least one piece of object data, wherein each of the first key-value pair data and the second key-value pair data includes key data and value data, and at least one piece of second key-value pair data included in a given piece of object data correspond to a given object;
determining an object data number of pieces of the object data included in the target data, an array data number of pieces of the array data included in the target data, a first key-value pair data number of pieces of the first key-value pair data included in the target data, and a second key-value pair data number of pieces of the second key-value pair data included in the target data;
determining a storage space for storing the target data based on the object data number, the array data number, the first key-value pair data number, and the second key-value pair data number; and
storing the target data into the storage space, wherein the storing the target data into the storage space comprises;
storing, for each piece of key-value pair data included in the target data, the key data included in the each piece of key-value pair data and the value data included in the each piece of key-value pair data into a storage area with contiguous addresses in a first preset storage area of the storage space;
sorting the stored key data to obtain a key data sequence;
determining a segment address of the first preset storage area;
determining, for each piece of key data in the key data sequence, an offset address of a storage address of the each piece of key data in the first preset storage area relative to the segment address to obtain an offset address sequence; and
storing, for each offset address in the offset address sequence, the each offset address into a second preset storage area in the storage space or a third preset storage area in the storage space, wherein the storing the each offset address into a second preset storage area in the storage space or a third preset storage area in the storage space comprises:

determining whether key data corresponding to the each offset address is included in the first key-value pair data or the second key-value pair data; storing the each offset address into the second preset storage area in the storage space if the key data corresponding to the each offset address is included in the first key-value pair data; and storing the each offset address into the third preset storage area in the storage space if the key data corresponding to the each offset address is included in the second key-value pair data.

* * * * *